(12) United States Patent
Saito

(10) Patent No.: US 8,726,099 B2
(45) Date of Patent: May 13, 2014

(54) DATA PROCESSING SYSTEM

(75) Inventor: Yasuhiko Saito, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 439 days.

(21) Appl. No.: 13/198,696

(22) Filed: Aug. 4, 2011

(65) Prior Publication Data

US 2012/0047403 A1   Feb. 23, 2012

(30) Foreign Application Priority Data

Aug. 23, 2010 (JP) ................................. 2010-185719

(51) Int. Cl.
*G06F 11/00* (2006.01)

(52) U.S. Cl.
USPC ..................... 714/47.2; 714/47.1; 714/47.3

(58) Field of Classification Search
USPC ...................... 714/47.1, 47.2, 47.3
See application file for complete search history.

(56) References Cited

U.S. PATENT DOCUMENTS

| | | | |
|---|---|---|---|
| 4,503,535 A * | 3/1985 | Budde et al. | 714/47.3 |
| 5,761,411 A * | 6/1998 | Teague et al. | 714/47.2 |
| 6,792,456 B1 * | 9/2004 | Hellerstein et al. | 709/224 |
| 7,036,049 B2 * | 4/2006 | Ali et al. | 714/47.2 |
| 7,051,099 B2 * | 5/2006 | Ziegler et al. | 709/224 |
| 7,653,839 B2 * | 1/2010 | Takahashi | 714/47.2 |
| 2006/0143492 A1 * | 6/2006 | LeDuc et al. | 714/2 |
| 2009/0044060 A1 * | 2/2009 | Noll et al. | 714/47 |
| 2010/0100775 A1 * | 4/2010 | Slutsman et al. | 714/47 |
| 2012/0047403 A1 * | 2/2012 | Saito | 714/47.2 |

FOREIGN PATENT DOCUMENTS

| | | | |
|---|---|---|---|
| JP | 8-305675 A | 11/1996 | |
| JP | 11-39032 A | 2/1999 | |

* cited by examiner

*Primary Examiner* — Joshua Lohn
(74) *Attorney, Agent, or Firm* — Miles & Stockbridge P.C.

(57) ABSTRACT

Disclosed is a data processing system capable of detecting a sign of abnormality in such a manner as to increase the degree of safety and availability of the system. The data processing system uses a prediction circuit that detects a sign of abnormality in accordance with a cumulative history of significant events encountered during the processing of CPUs. The prediction circuit retains latest notification timing information about periodic notification from the CPUs in association with the CPUs, acquires elapsed time from the latest notification timing at predetermined intervals, and successively retains history information corresponding to changes in the elapsed time from a target value in association with the CPUs. When the retained history information reaches a predetermined threshold value, the prediction circuit concludes that there is a sign of abnormality.

18 Claims, 13 Drawing Sheets

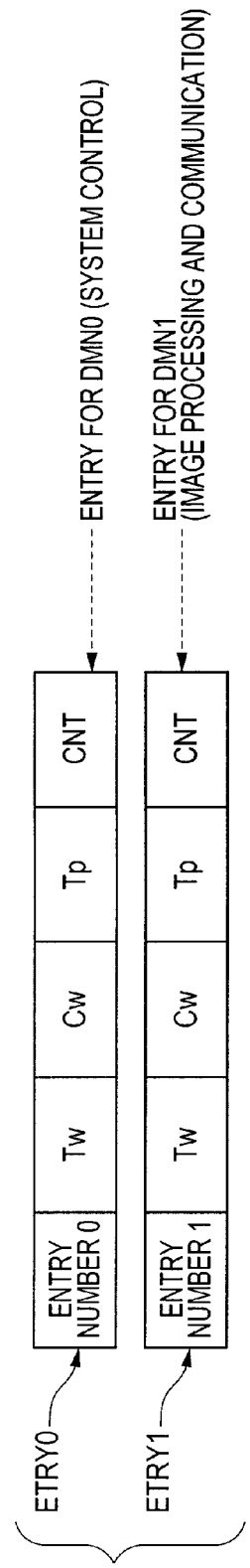
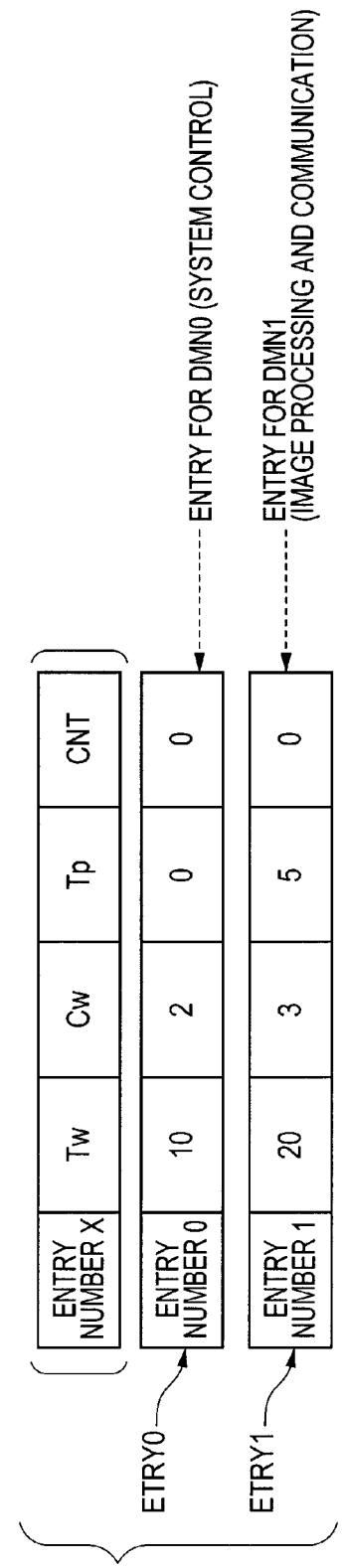
FIG. 5
FIG. 6

DATA PROCESSING SYSTEM

CROSS-REFERENCE TO RELATED APPLICATIONS

The disclosure of Japanese Patent Application No. 2010-185719 filed on Aug. 23, 2010 including the specification, drawings, and abstract is incorporated herein by reference in its entirety.

BACKGROUND

The present invention relates to a technology for predicting a CPU abnormality in a data processing system having plural CPUs (central processing units), and more particularly to such a prediction technology that is effectively applicable to a microcomputer integrated, for instance, into a single-chip semiconductor integrated circuit.

When a functionally-distributed system is to be configured with a data processing system having plural CPUs, the individual CPUs are assigned specific functions. For the sake of convenience, functional units implemented by such CPUs and programs are referred to as domains. Each domain may include a specific operating system (OS) and an accelerator. When integrated into a single-chip semiconductor integrated circuit, the functionally-distributed system can meet a demand for functional enhancement and a demand for cost reduction by integration of plural systems. The individual domains communicate with each other to process data while accessing, for instance, their assigned specific memory regions, shared memory regions, and shared resources as needed.

In the above-described system-on-chip (SoC) microcomputer, for example, the data processing result produced by one domain is often used by another domain. Therefore, when, for instance, a data processing operation of a certain domain needs to be performed in real-time, it may be fatally affected by a delay in a data processing operation of another domain. A preventive measure to be taken to avoid the above situation is to preset, for instance, the maximum permissible time between the instant at which a first domain issues a request to a second domain and the instant at which a response arrives. If no response arrives within the maximum permissible time, the microcomputer may conclude that a critical failure has occurred in the first domain, and issue beforehand an associated instruction for performing error handling. However, if the preset maximum permissible time is excessively short, the microcomputer may conclude that a critical failure has occurred even when a temporary memory access concentration or other similar failure has simply occurred in the second domain. If, on the other hand, the preset maximum permissible time is excessively long, the microcomputer may persistently wait for a response from the second domain so that system recovery cannot be achieved due to the loss of a real-time action in the first domain. If a sign of an abnormality of the second domain can be detected in advance, the first domain can perform a preventive process to avoid the abnormality without impairing the real-time action in the first domain. This will contribute to system stability.

A technology for detecting a sign of domain abnormality in advance is described, for instance, in Japanese Unexamined Patent Publication No. Hei 08 (1996)-305675. This technology provides a system health check function that causes a monitoring CPU to transfer a predetermined value to a monitored CPU and allows the monitored CPU to return the transferred value to the monitoring CPU. This enables the monitoring CPU to judge that the monitored CPU is normal.

A technology described in Japanese Unexamined Patent Publication No. Hei 11 (1999)-039032 causes a monitored CPU to transfer its calculated value to a monitoring CPU when a timer times out. The monitoring CPU compares the value transferred from the monitored CPU against a value managed by itself. If the compared values agree with each other, the monitoring CPU judges that the monitored CPU is abnormal, that is, the monitored CPU cannot newly calculate a correct value.

SUMMARY

However, the technology described in Japanese Unexamined Patent Publication No. Hei 08 (1996)-305675 concludes that the monitored CPU is abnormal when only one check reveals that the values do not agree with each other. It means that safe recovery cannot be achieved or that unduly stringent constraints are imposed. This narrows the range of choice between the priority of system safety and the priority of system availability. Thus, it is difficult to enjoy the effectiveness provided by the early detection of a sign of abnormality. There is the same problem with the technology described in Japanese Unexamined Patent Publication No. Hei 11 (1999)-039032 because a single discrepancy or a delayed registration causes the monitoring CPU to conclude that an abnormality exists.

The present invention has been made in view of the above circumstances and provides a data processing system that is capable of detecting a sign of abnormality in such a manner as to enlarge the range of choice between the priority of system safety and the priority of system availability.

The above and other advantages and novel features of the present invention will become apparent from the following detailed description taken in conjunction with the accompanying drawings.

A representative aspect of the present invention disclosed in this document is briefly summarized below.

The data processing system according to the representative aspect of the present invention includes a prediction circuit, which detects a sign of abnormality in accordance with a cumulative history of significant events encountered during the processing of a CPU. The prediction circuit retains the information about latest notification timing of periodical notification from the CPU in association with the CPU, acquires the elapsed time from the latest notification timing at predetermined intervals, successively retains history information corresponding to changes in the elapsed time from a target value in association with the CPU, and detects that a predetermined threshold value is reached by the retained history information. Upon such detection, the prediction circuit concludes that there is a sign of abnormality.

A sign of abnormality is detected in accordance with a cumulative history of significant events. Therefore, in marked contrast to a case where a sign of abnormality is recognized upon a single occurrence of a particular event, a sign of abnormality can be detected in such a manner as to enlarge the range of choice between the priority of system safety and the priority of system availability.

An advantage provided by the representative aspect of the present invention disclosed in this document is briefly described below.

The representative aspect of the present invention makes it possible to detect a sign of abnormality in such a manner as to enlarge the range of choice between the priority of system safety and the priority of system availability.

BRIEF DESCRIPTION OF THE DRAWINGS

An embodiment of the present invention will be described in detail based on the following figures, in which:

FIG. 5 is a diagram that presents an example based on FIG. 1 to illustrate the relationship between entry data storage areas and domains;

FIG. 6 is a diagram showing an initial setup example for the entry data storage areas shown in FIG. 5;

DETAILED DESCRIPTION

1. Overview of Embodiment

Figure 1:
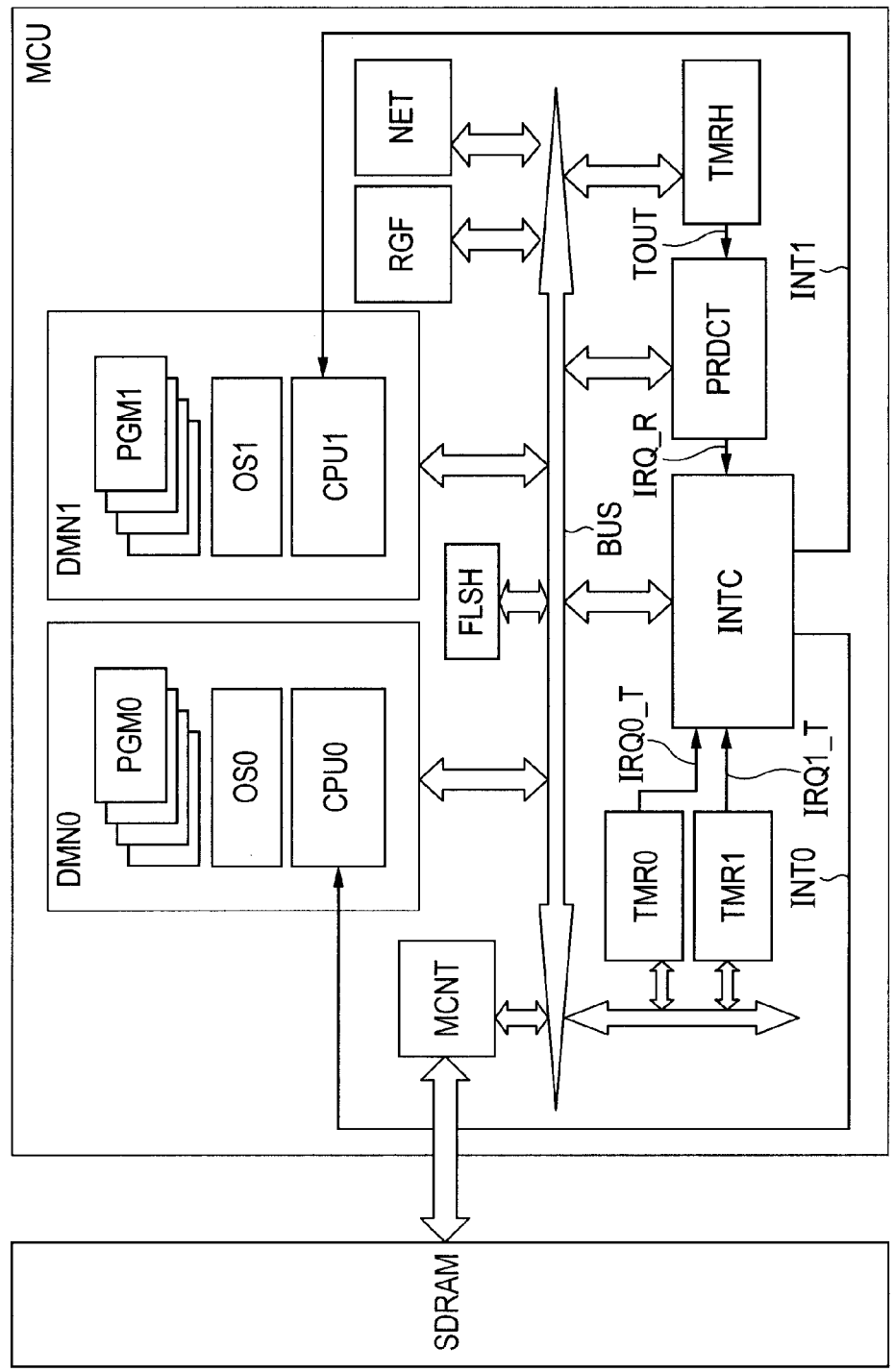
FIG. 1 is a block diagram showing a microcomputer according to an embodiment of the present invention.

First, the outline of a representative embodiment of the present invention disclosed in this document will be described. In the outline description of the representative embodiment, parenthesized reference numerals for the accompanying drawings are given only to illustrate some concepts of elements therewith.

[1] <Abnormality Prediction Judgment Based on History of Periodic Notification Timing>

A data processing system (MCU) according to the representative embodiment of the present invention includes plural CPUs (CPU0, CPU1, CPU2, CPU3) and a prediction circuit (PRDCT), which makes a judgment to predict an abnormality in the CPUs. The prediction circuit retains latest notification timing information (Tp[0], Tp[1], Tp[2]) about periodic notification from the CPUs in association with the CPUs, acquires elapsed time (Tdiff) from the latest notification timing at predetermined intervals, and successively retains history information (CNT, ACC) corresponding to changes in the elapsed time from a target value (Tw) in association with the CPUs. When the retained history information reaches a predetermined threshold value (Cw), the prediction circuit issues a request (IRQ_R) for a recovery process for an associated CPU.

A sign of abnormality is detected in accordance with a cumulative history of significant events, namely, the changes in the elapsed time from the latest notification timing, which are acquired at predetermined intervals. Therefore, in marked contrast to a case where a sign of abnormality is recognized upon a single occurrence of a particular event, a sign of abnormality can be detected in such a manner as to enlarge the range of choice between the priority of system safety and the priority of system availability. In other words, when the aforementioned target value and threshold value are properly set up, the choice between the priority of system safety and the priority of system availability can be easily made in accordance with system performance characteristics and system requirements specifications.

[2] <Periodic Notification Upon Timer Timeout>

In the data processing system described in section 1, the periodic notification from the CPUs is a notification that is given to the prediction circuit when the CPUs process a program upon timeout (IRQ0_T-IRQ3_T) of a first timer (TMR0-TMR3).

The timing of the periodic notification is programmable by adjusting the timeout setting for the first timer. The contents of the periodic notification can be determined as desired by a CPU-executable program.

[3] <Timeout Setting Programmable for each CPU>

In the data processing system described in section 2, the first timer includes plural timer channels (TMR0-TMR3). The timer channels (TMR0-TMR3) can perform timeout setup at a timing that varies from one CPU to another.

The timing of the periodic notification can be defined for each CPU on an individual basis.

[4] <Generation of Predetermined Intervals Upon Timer Timeout>

In the data processing system described in any one of sections 1 to 3, the predetermined intervals correspond to intervals at which a second timer (TMRH) times out (TOUT).

The setting for the predetermined intervals is programmable by adjusting the timeout setting for the second timer.

[5] <Time Information Given to Define the Timing if Periodic Notification>

In the data processing system described in any one of sections 1 to 4, the information about the notification timing is the information about time at which the periodic notification is sent to the prediction circuit.

As the time information is given, the information about the notification timing can be acquired with ease.

[6] <History Information Based on the Cumulative Number of Times the Periodic Notification Was Delayed>

Figure 7:
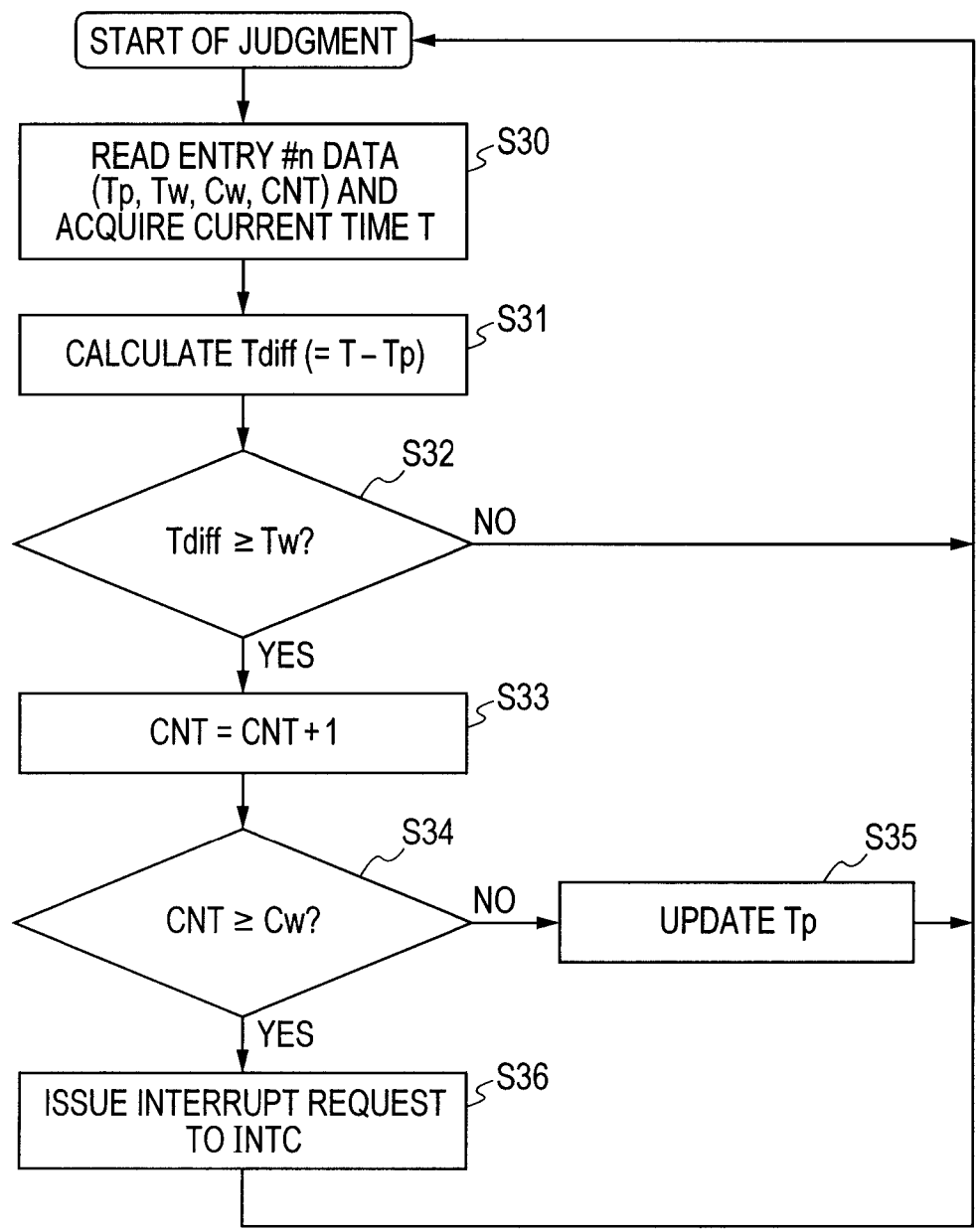
FIG. 7 is a flowchart illustrating an abnormality prediction judgment process performed by a prediction judgment controller PCNT.

In the data processing system described in section 5, the history information is information indicative of the cumulative number of times the periodic notification was delayed from the target value (FIG. 7).

The cumulative number of times corresponds to the severity of a sign of abnormality. The severity of a sign of abnormality that is to be detected may be determined in accordance with the predetermined threshold value.

[7] <History Information Based on Cumulative Time by which the Periodic Notification was Delayed>

In the data processing system described in section 5, the history information is information indicative of cumulative time by which the periodic notification was delayed from the target value.

The length of the cumulative time corresponds to the severity of a sign of abnormality. The severity of a sign of abnormality that is to be detected may be determined in accordance with the predetermined threshold value.

[8] <History Information Based on the Difference Between the Number of Times the Periodic Notification was in Time and the Number of Times the Periodic Notification was Delayed>

Figure 10:
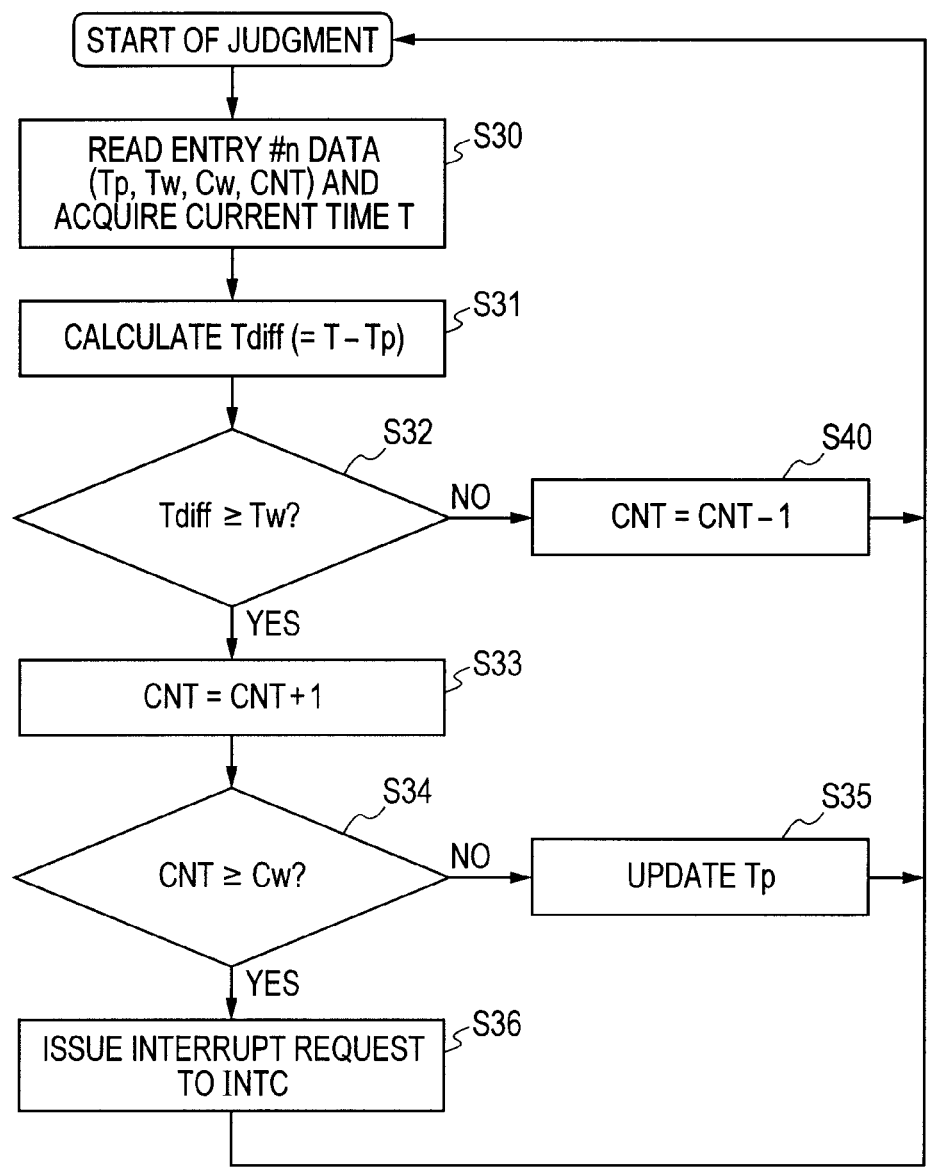
FIG. 10 is a flowchart showing another example of abnormality prediction.

In the data processing system described in section 5, the history information is information indicative of the difference between the number of times the periodic notification was in time for the target value and the number of times the periodic notification was delayed from the target value (FIG. 10).

When the severity of a sign of abnormality varies, the above difference makes it possible to evaluate the recovery from the sign of abnormality and determine the severity of the sign of abnormality.

[9] <History Information Based on the Difference Between the Length of Extra Time Provided when the Periodic Notification was in Time and the Length of Time by which the Periodic Notification was Delayed>

Figure 11:
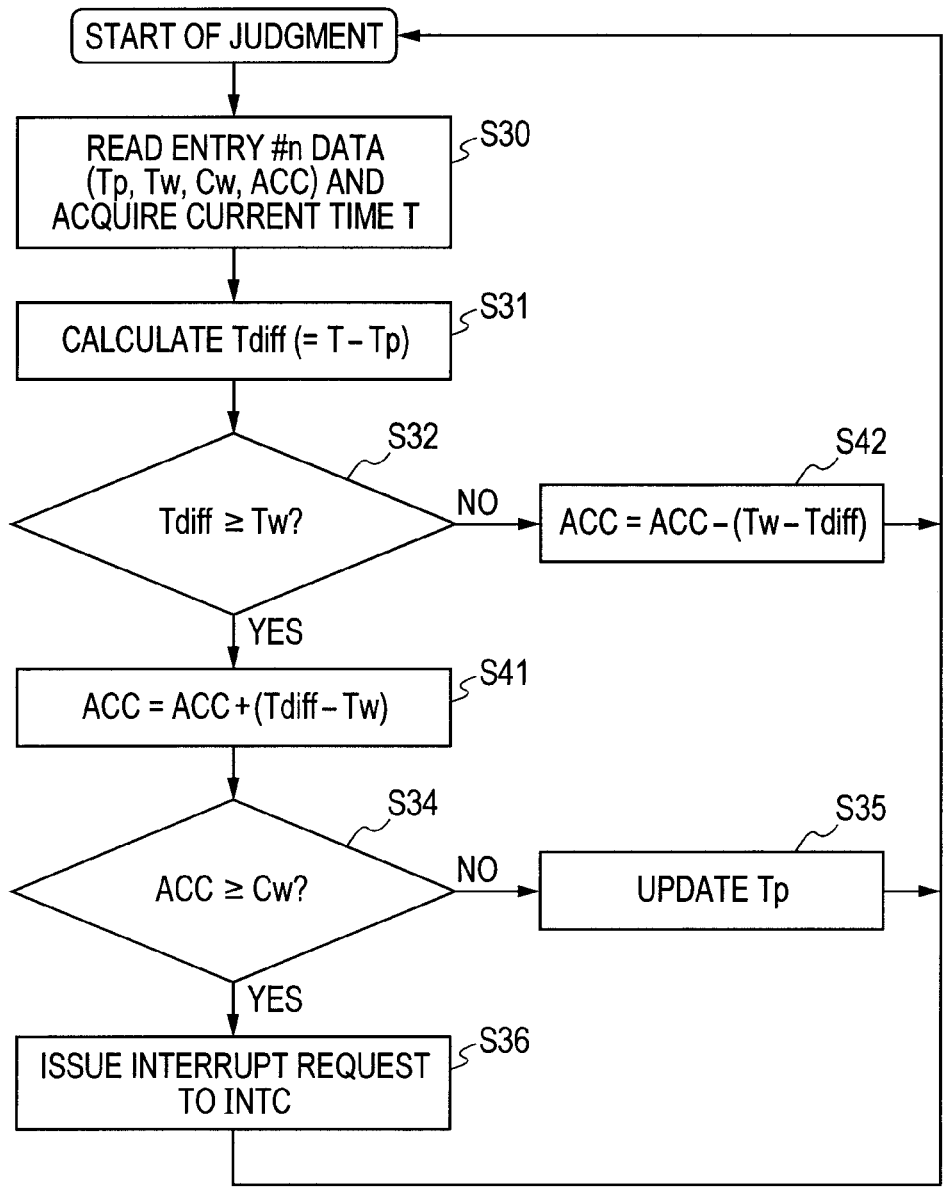
FIG. 11 is a flowchart showing still another example of abnormality prediction.

In the data processing system described in section 5, the history information is information indicative of the difference between the length of extra time provided when the periodic notification was in time for the target value and the length of time by which the periodic notification was delayed from the target value (FIG. 11).

When the severity of a sign of abnormality varies, the above difference makes it possible to evaluate the recovery from the sign of abnormality and determine the severity of the sign of abnormality.

[10] <Storage Area for Entry Data such as History Information>

In the data processing system described in section 5, the prediction circuit has storage areas (ERTY0-ETRYn) for entry data related to the CPUs. The entry data includes time information (Tp), namely, the information about the notification timing, history information (CNT, ACC), a target value (Tw), and a threshold value (Cw).

As each CPU is provided with its own entry data storage area, it is easy to detect a sign of abnormality in each CPU.

[11] <Initial Setup for Entry Data>

In the data processing system described in section 10, the storage areas for the entry data can be initially set up by a predetermined CPU.

The target value and the threshold valve can be set up in accordance with the real-time processability, processing speed, and other data processing characteristics of a CPU targeted for sign-of-abnormality detection. In other words, a sign of system abnormality can be detected in accordance with the functionality and capability of the data processing system.

[12] <Request for a Recovery Process for an Associated CPU>

In the data processing system described in any one of sections 1 to 11, a request for a recovery process for an associated CPU is an interrupt request (IRQ_R) to a CPU for which the recovery process is to be performed.

When an interrupt is used, it is easy to define the recovery process as desired in accordance with the associated interrupt process.

[13] <Interrupt Controller>

The data processing system described in section 12 further includes an interrupt controller (INTC) that outputs an interrupt signal to a CPU in response to the interrupt request.

Interrupt priority level control, interrupt vector control, and other control operations for an interrupt request can be easily applied to the recovery process.

[14] <Recovery Process Performed by Shutdown>

In the data processing system described in any one of sections 1 to 13, the recovery process is a shutdown process for an associated CPU (step S51).

A CPU exhibiting a sign of abnormality can be completely prevented from performing an undesired operation.

[15] <Recovery Process Performed by Reboot>

In the data processing system described in any one of sections 1 to 13, the recovery process is a reboot process for an associated CPU (step S61).

A CPU exhibiting a sign of abnormality can be initialized for reuse.

[16] <Recovery Process Performed by Saving Relevant Information into Memory>

In the data processing system described in any one of sections 1 to 13, the recovery process is a process that is performed by saving the internal state of an associated CPU into memory (step S71).

Information saved into memory can be used to restore the state of the CPU.

[17] <Recovery Process Performed by Terminating a Process-Sharing Scheme>

In the data processing system described in any one of sections 1 to 13, the recovery process is a process that is performed by terminating a process assigned to an associated CPU and performing the process locally (steps S81 and S82).

As the process is performed locally, it is possible to avoid a situation where the process is halted.

[18] <Microcomputer Integrated into a Semiconductor Integrated Circuit>

The data processing system described in any one of sections 1 to 17 is formed as a microcomputer (MCU) on a semiconductor substrate.

When integrated into a single-chip semiconductor integrated circuit, the functionally-distributed data processing system can meet a demand for functional enhancement and a demand for cost reduction by integration of plural systems.

2. Details of Embodiment

An embodiment of the present invention will be described in greater detail below.

<<Microcomputer>>

FIG. 1 is a diagram illustrating a data processing system according to an embodiment of the present invention. The data processing system shown in FIG. 1 is applicable to, although not limited to, a system-on-chip (SoC) microcomputer (microprocessor or data processing device) that is implemented, for instance, by integrating an automotive control system and a navigation or other information system into a single semiconductor integrated circuit.

The microcomputer MCU shown in FIG. 1 is formed on a monocrystalline silicon substrate or other semiconductor substrate by using, for instance, a CMOS integrated circuit manufacturing technology. The microcomputer MCU includes, but not limited to, two domains, namely, a first domain DMN0 and a second domain DMN1. The domains DMN0, DMN1 are functional units implemented by a CPU and its operating program. The domain DMN0 includes a central processing unit CPU0; an operating system OS0, which is an upper-level program for exercising memory management and task management of resources for the central processing unit CPU0; and application programs PGM0 for defining tasks. Similarly, the domain DMN1 includes a central processing unit CPU1, an operating system OS1, and application programs PGM1.

The domains DMN0, DMN1 share a system bus BUS. Representative resources coupled to the system bus BUS include a memory controller MCNT, an electrically rewritable nonvolatile memory FLSH, timer circuits TMR0, TMR1, an image processing circuit GRF, a network communication circuit NET, an interrupt controller INTC, an abnormality prediction circuit (unhealthy prediction circuit, failure prediction circuit) PRDCT, and a timer circuit TMRH. The timer circuits TMR0, TMR1 are used as first timers, whereas the timer circuit TMRH is used as a second timer. A synchronous dynamic random access memory SDRAM is coupled to the memory controller MCNT as an external memory. The synchronous dynamic random access memory SDRAM is used, for instance, as a frame buffer for the image processing circuit GRF, as a communication buffer for the network communication circuit NET, and as work areas for the central processing units CPUs. The timer circuits TMR0, TMR1 output timeout interrupt request signals IRQ0_T, IRQ1_T to the interrupt controller INTC. The timer circuit TMRH outputs a timeout signal TOUT to the abnormality prediction circuit PRDCT. The abnormality prediction circuit PRDCT outputs a recovery interrupt request signal IRQ_R to the interrupt controller INTC. The interrupt controller INTC outputs an interrupt signal INT0 to the central processing unit CPU0 in the domain DMN0 and an interrupt signal INT1 to the central processing unit CPU1 in the domain DMN1.

Figure 2:
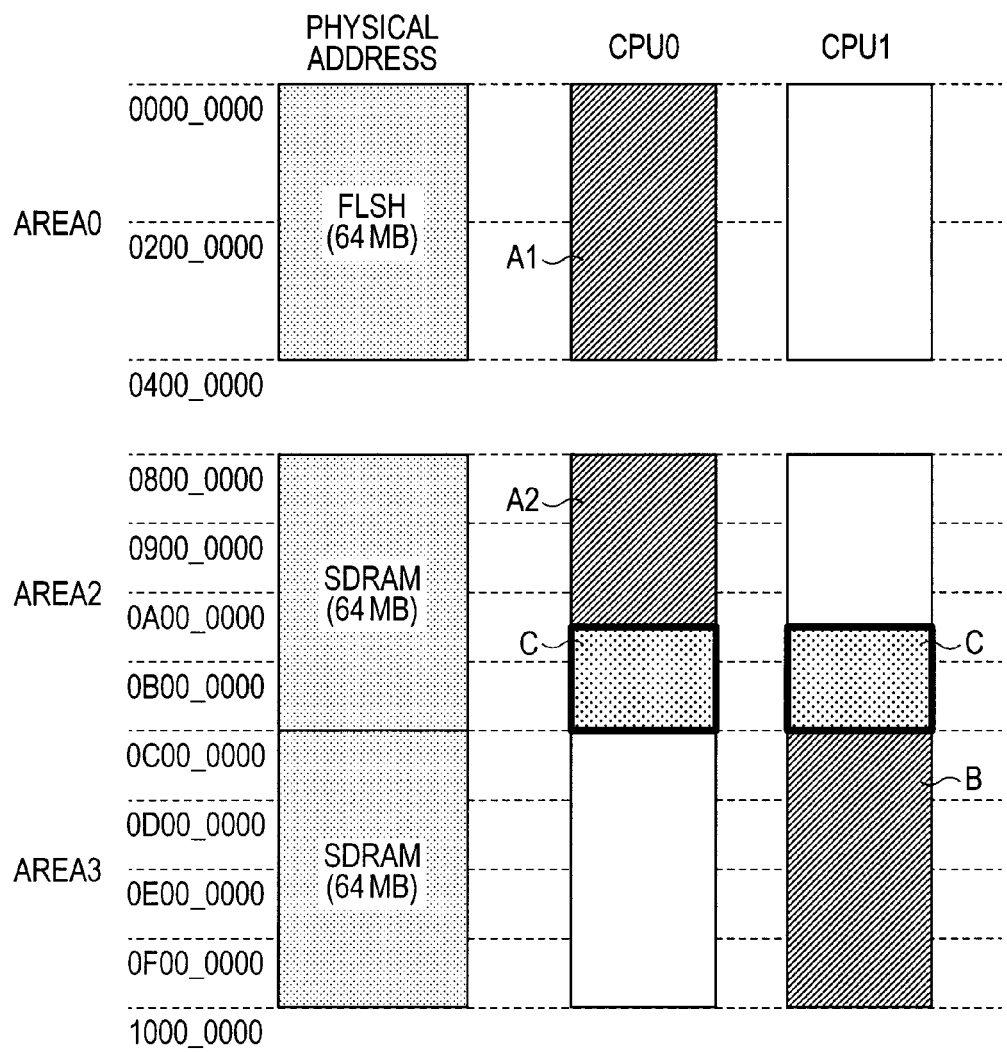
FIG. 2 is an address mapping diagram showing an example of memory space mapping for central processing units.

FIG. 2 shows an example of memory space mapping for the central processing units. The memory space mapping example shown in FIG. 2 relates to the nonvolatile memory FLSH and synchronous dynamic random access memory SDRAM. Memory spaces A1, A2 can be accessed by the central processing unit CPU0 only. A memory space B can be accessed by the central processing unit CPU1 only. A memory space C is a shared memory space that can be accessed by both central processing units CPU0, CPU1. The shared memory space C is used, for instance, to exchange data between the domain DMN0 and the domain DMN1.

Figure 3:
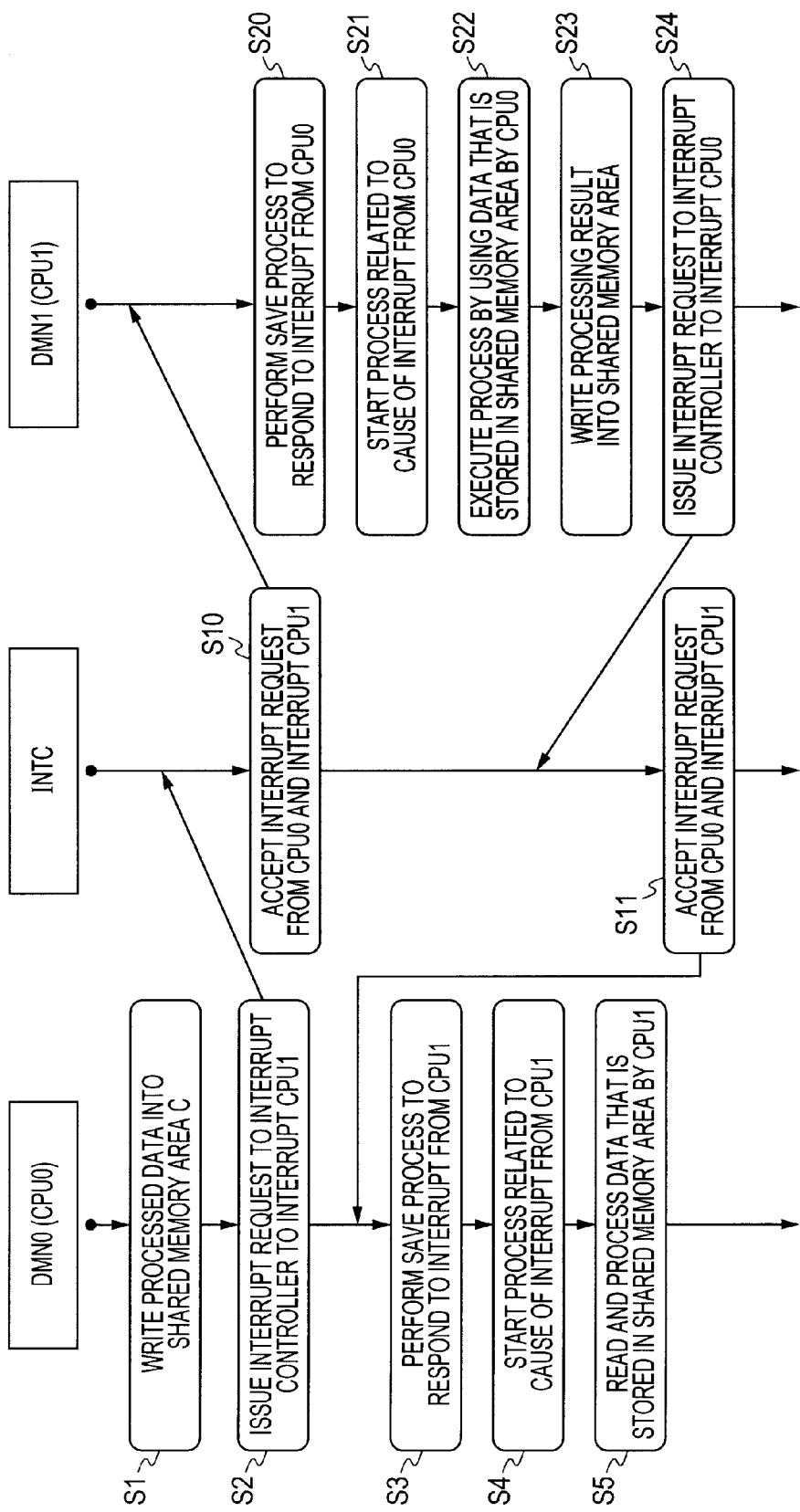
FIG. 3 is a flowchart illustrating a process in which an interrupt is used to let a domain DMN1 perform a part of the processing in a domain DMN0.

FIG. 3 is a flowchart illustrating a process in which an interrupt is used to let the domain DMN1 perform a part of the process to be performed by the domain DMN0.

The central processing unit CPU0 in the domain DMN0 writes a predefined (predetermined) data processing result into the shared memory area C (step S1). To have the central processing unit CPU1 in the domain DMN1 perform the next data process, which uses the data written into the shared memory area C, the central processing unit CPU0 issues an interrupt request to the interrupt controller INTC (step S2).

The interrupt controller INTC accepts the interrupt request, outputs an interrupt signal INT1 to the central processing unit CPU1, and outputs an associated cause of interrupt to the system bus BUS (step S10).

When notified of an interrupt by the interrupt signal INT1, the central processing unit CPU1 halts its instruction execution and performs a necessary save process (step S20). Next, the central processing unit CPU1 branches to an interrupt processing program associated with the cause of interrupt (step S21), and performs necessary data processing by using data in the shared memory area C (step S22). The central processing unit CPU1 then writes data derived from data processing into the shared memory area C (step S23), and issues an interrupt request to the interrupt controller INTC in order to pass the written data to the central processing unit CPU0 (step S24).

Upon receipt of the interrupt request, the interrupt controller INTC outputs an interrupt signal INT0 to the central processing unit CPU0, and outputs an associated cause of interrupt to the system bus BUS (step S11).

When notified of an interrupt by the interrupt signal INT0, the central processing unit CPU0 halts its instruction execution and performs a necessary save process (step S3). Next, the central processing unit CPU0 branches to an interrupt processing program associated with the cause of interrupt (step S4), and reads data from the shared memory area C to perform necessary data processing in accordance with the interrupt processing program (step S4).

If the interval between the instant at which an interrupt is requested in step S2 and the instant at which the interrupt signal INT1 is received in step S11 is unduly long, the central processing unit CPU0 may fail to satisfy real-time requirements concerning the data processing performed by using the data in the shared memory area C. The abnormality prediction circuit PRDCT predicts an abnormality causing a situation where the interval is unduly long, and permits early recovery. The abnormality prediction circuit PRDCT will be described in detail below.

<<Abnormality Prediction Circuit>>

Figure 4:
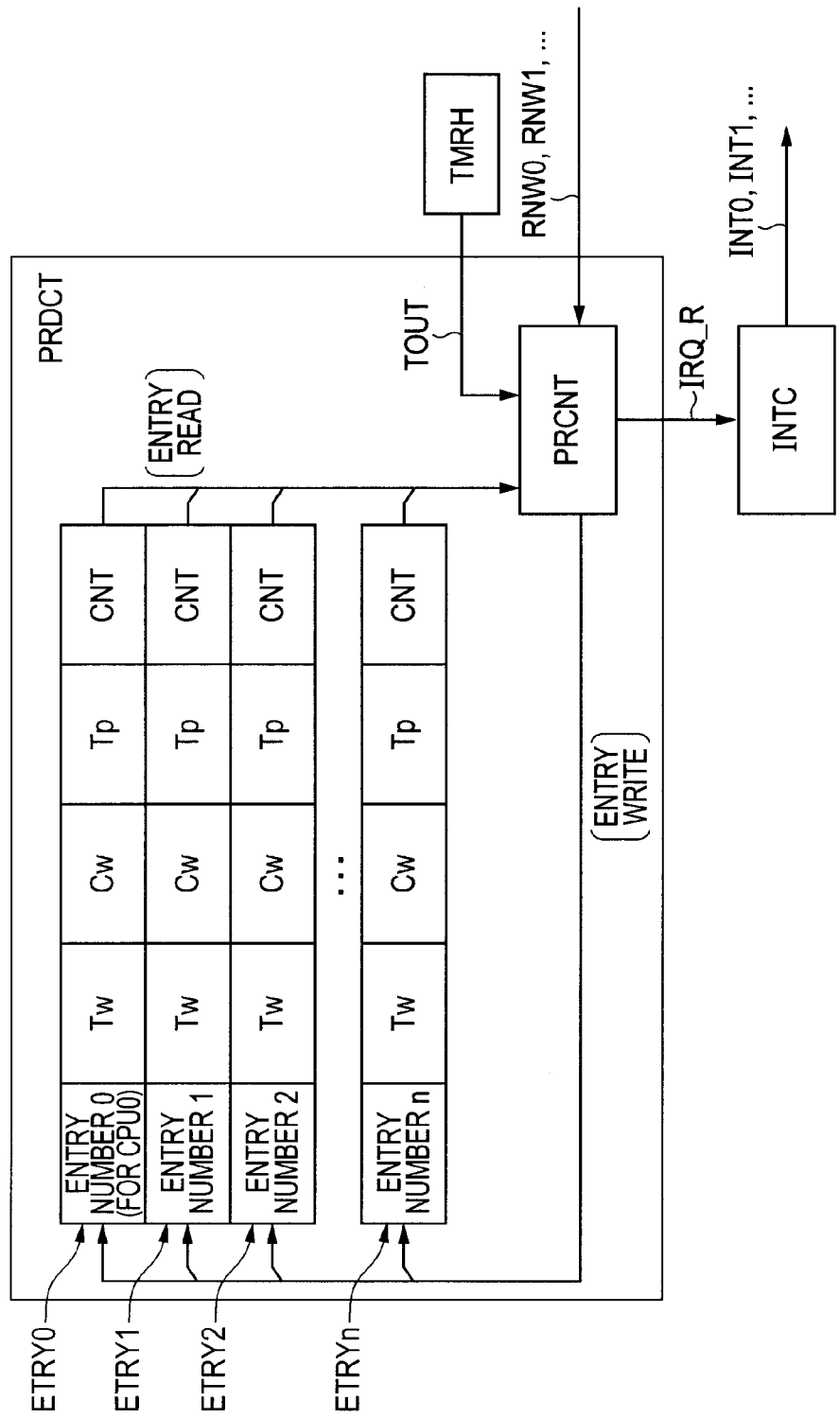
FIG. 4 is a block diagram illustrating the configuration of an abnormality prediction circuit PRDCT.

FIG. 4 illustrates the configuration of the abnormality prediction circuit PRDCT. The abnormality prediction circuit PRDCT functions between a central processing unit that is targeted for prediction and a central processing unit that achieves recovery in accordance with the result of prediction. Referring to FIG. 4, the abnormality prediction circuit PRDCT has entry data storage areas ERTY0-ETRYn that are related to the individual domains or central processing units. Here, it is assumed, for the sake of convenience, that there are n+1 entry data storage areas. However, when the employed configuration is as shown in FIG. 1, two entry data storage areas ERTY0, ETRY1 will suffice. In reality, a random access memory may be employed to provide the entry data storage areas ERTY0-ETRYn. During an abnormality prediction operation, a prediction judgment controller PCNT reads/writes entry data. Further, a particular central processing unit that serves as a master, such as, for instance, the central processing unit CPU0 performs entry data initial setup through the system bus BUS.

The entry data includes, for instance, notification time information Tp, a target value Tw, a threshold value Cw, and a history count CNT.

The notification time information Tp is time information indicative of the latest notification timing of periodic notification from a central processing unit targeted for prediction. For example, the notification time information Tp about the entry data storage area ERTY0 having the entry number 0, which relates to the domain DMN0, is generated as described below. Each time the timer TMR0 issues a timeout interrupt request IRQ0_T, the central processing unit CPU0 executes a predetermined interrupt processing program in response to such a timeout interrupt request. An entry update signal RNW0 is then given to the prediction judgment controller PCNT. The entry update signal RNW0 is a signal unique to the central processing unit CPU0. For example, it may be an identification code of the central processing unit CPU0 that the central processing unit CPU0 writes at a particular register address in the prediction judgment controller PCNT. The prediction judgment controller PCNT acquires time information, for instance, from a real-time clock timer (not shown) upon receipt of the entry update signal RNW0, and updates the notification time information Tp about the entry data storage area ERTY0 having the entry number 0, which relates to the entry update signal RNW0. The same holds for the notification time information Tp about the entry data storage area ETRY1 having the entry number 1, which relates to the other domain DMN1.

Each time the timeout signal TOUT is received from the timer circuit TMRH at predetermined intervals and each time an entry update signal is received, the prediction judgment controller PCNT judges whether the difference (Tdiff) between the latest notification time information Tp and the current time Th has reached the target value Tw. The timeout intervals provided by the timeout signal TOUT are shorter than intervals at which, for example, the timer TMR0 (TMR1) issues the timeout interrupt request IRQ0_T (IRQ1_T).

When Tw≤Tdiff, the prediction judgment controller PCNT manipulates the history count CNT. The operation performed to manipulate the history count CNT is not specifically limited as far as it retains a cumulative history of such judgment results. However, the history count CNT may be incremented, for instance, by one each time the obtained judgment indicates that Tw≤Tdiff.

When the history count CNT reaches the threshold value Cw, the prediction judgment controller PCNT issues the interrupt request signal IRQ_R to the interrupt controller INTC for the purpose of requesting an associated central processing unit to perform a recovery process. In response to the interrupt request signal IRQ_R, the interrupt controller INTC outputs the interrupt signal INT0 (INT1) to a central processing unit CPU0 (CPU1) that is to be mainly involved in the recovery process. In this instance, an associated cause of interrupt is also given to such a central processing unit. More specifically, the interrupt signal INT1 for the central processing unit CPU1 is activated when the history count CNT of the entry data storage area ERTY0 having the entry number 0, which relates to the domain DMN0, has reached its threshold value Cw, whereas the interrupt signal INT0 for the central processing unit CPU0 is activated when the history count CNT of the entry data storage area ETRY1 having the entry number 1, which relates to the domain DMN1, has reached its threshold value Cw.

FIG. 5 presents an example based on FIG. 1 to illustrate the relationship between entry data storage areas and domains. The entry data storage area ERTY0 relates to the domain DMN0, whereas the entry data storage area ETRY1 relates to the domain DMN1. The domain DMN0 is used to control the entire system (provide overall system control), whereas the domain DMN1 is used to control image and communication processing operations.

FIG. 6 shows an initial setup example for the entry data storage areas shown in FIG. 5. As is obvious from FIG. 6, the settings for the target value Tw and the threshold value Cw are more stringent for the domain DMN0, which provides system control, than for the domain DMN1. The notification time information Tp can also be initially set up.

<<Flow of Abnormality Prediction>>

FIG. 7 illustrates an abnormality prediction judgment process performed by the prediction judgment controller PCNT. The judgment process shown in FIG. 7 starts each time the prediction judgment controller PCNT receives the timeout signal TOUT from the timer TMRH at predetermined intervals and each time the prediction judgment controller PCNT receives the entry update signals RNW0, RNW1. At the beginning of the judgment process, the prediction judgment controller PCNT first reads associated entry data Tp, Tw, Cw, CNT and acquires the current time Th (step S30).

Next, the prediction judgment controller PCNT computes the difference (Tdiff) between the latest notification time information Tp and the current time Th (step S31), and then judges whether the computed difference has reached the target value Tw (step S32). When the result of judgment indicates that Tw≤Tdiff, the history count CNT is incremented by one (step S33).

Next, the prediction judgment controller PCNT judges whether the history count CNT has reached the threshold value Cw (step S34). If the threshold value Cw is greater than the history count CNT, the prediction judgment controller PCNT updates the notification time information Tp to its latest information (step S35). If, on the other hand, the threshold value Cw is not greater than the history count CNT, the prediction judgment controller PCNT issues the interrupt request signal IRQ_R to the interrupt controller INTC for the purpose of requesting an associated central processing unit to perform a recovery process (step S36). When, for instance, the history count CNT of the entry data storage area ERTY0 having the entry number 0, which relates to the domain DMN0, reaches its threshold value Cw, the interrupt signal INT1 for the central processing unit CPU1 is activated. When, on the other hand, the history count CNT of the entry data storage area ETRY1 having the entry number 1, which relates to the domain DMN1, reaches its threshold value Cw, the interrupt signal INT0 for the central processing unit CPU0 is activated. When such an interrupt signal is activated for a central processing unit, the central processing unit performs a recovery process defined by the interrupt processing program in response to the interrupt indicated by the activated interrupt signal. The recovery process will be described in detail later.

<<Timing of Abnormality Prediction Operation>>

Figure 8:
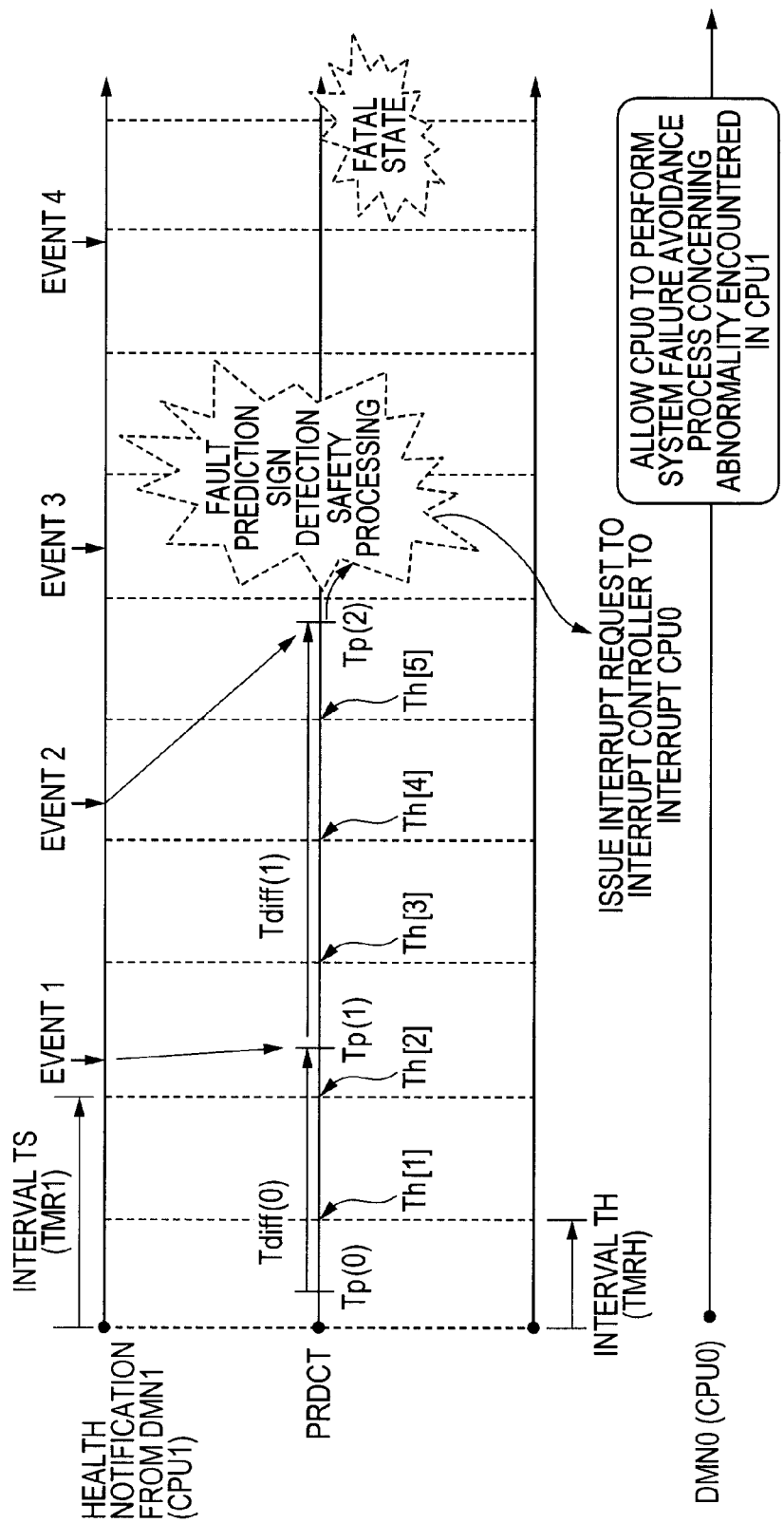
FIG. 8 is a timing diagram illustrating a judgment operation performed by the prediction judgment controller PCNT.
Figure 9:
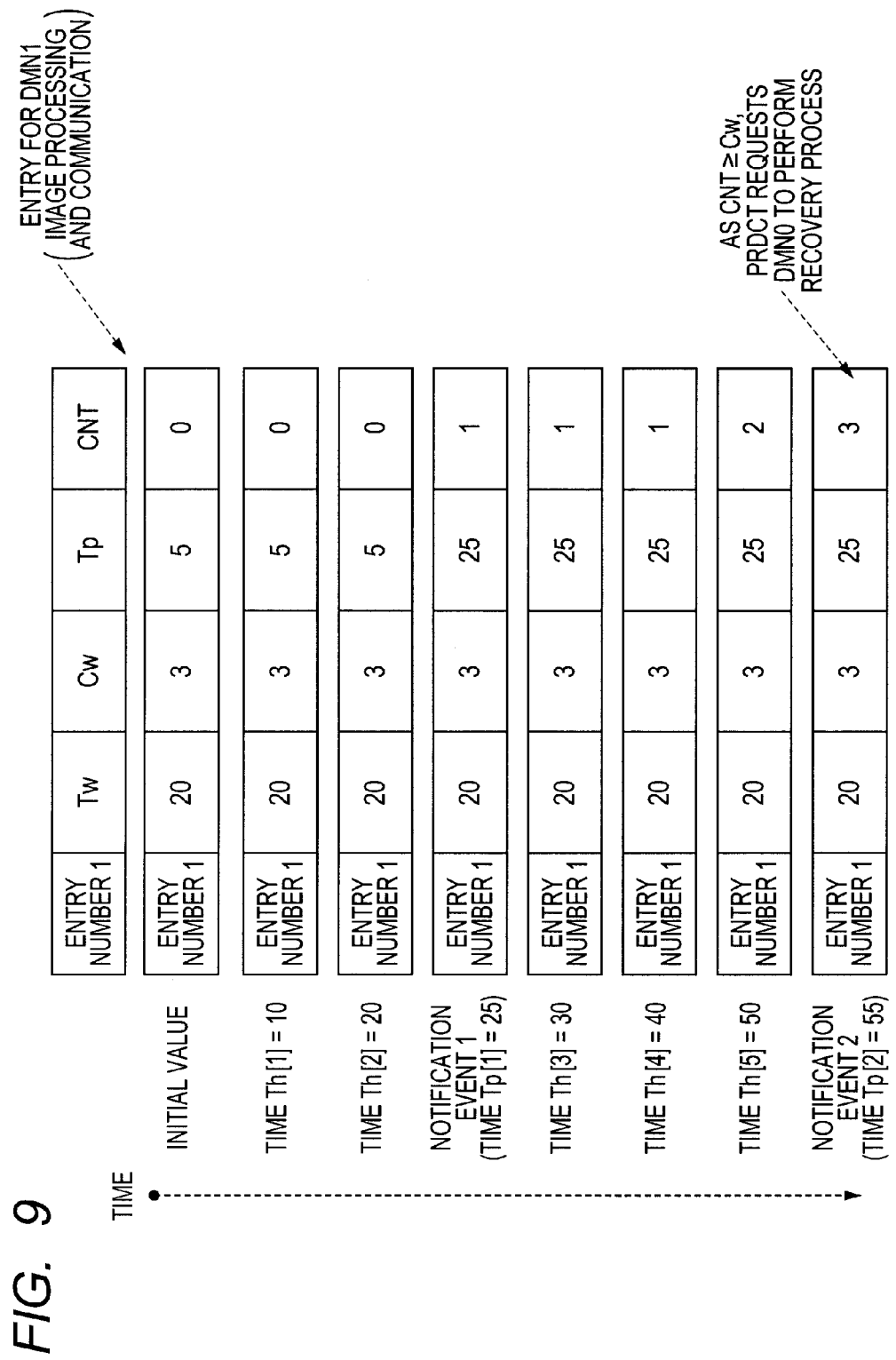
FIG. 9 is a timing diagram illustrating changes in entry data manipulated during the operation shown in FIG. 8.

FIG. 8 is a timing diagram illustrating a judgment operation performed by the prediction judgment controller PCNT. FIG. 9 is a timing diagram illustrating changes in entry data manipulated during the operation shown in FIG. 8. Here, an abnormality prediction judgment operation performed relative to the domain DMN1 is illustrated.

As shown in FIG. 9, the initial values of the entry data in the storage area ETRY1 (having the entry number 1) for the domain DMN1 are 20 for Tw, 10 for Cw, 5 for Tp, and 0 for CNT. It is assumed that the cycle of the timer interrupt IRQ1_T of the timer TMR1 is TS, and that the cycle of timeout TOUT provided by the timer TMRH is TH. The symbols Th[1] to Th[5] represent the timing of judgment operations that are performed by the prediction judgment controller PCNT at intervals of TH. The symbols Tp(0), Tp(1), and Tp(2) represent the timing at which the central processing unit CPU1 gives the update signal RNW1 due to an interrupt process that is performed in response to the interrupt request IRQ1_T, which is issued by the timer TMR1 at intervals of TS. The intervals at which the timer TMR1 issues the interrupt request IRQ1_T is. TS and fixed. However, the generation timings Tp(1), Tp(2) of the update signal RNW1, which is supplied from the central processing unit CPU1 in response to the interrupt request IRQ1_T, are not fixed. The reason is that an interrupt process to be performed by the central processing unit CPU1 in response to the interrupt request IRQ1_T is affected, for instance, by the contention of the system bus BUS that occurs when an attempt is made to give the data processing status of the central processing unit CPU1 and the update signal RNW1 to the prediction judgment controller PCNT. Further, if the central processing unit CPU1 has a fault, the execution of an associated interrupt processing program is delayed or aborted depending on the severity of the fault. This will affect the generation timing of the update signal RNW1. Events 1 to 4 represent the execution start timing of an interrupt process that the central processing unit CPU1 performs to output the update signal RNW1.

Until time Th[2] (=20), the CNT is maintained at 0 (zero) because the difference between the Th and the Tp is smaller than the Tw. At timing Tp(1) at which Th=25, the unupdated Tp is 5 and the difference between the Th (=25) and the Tp (=5) is not smaller than the Tw (=20). Thus, the CNT is incremented by one to 1. As the CNT is updated in this manner, the Tp is updated to 25, which is the latest value. Subsequently until Th[4], the CNT is maintained at 1 because the difference between the Th and the Tp is smaller than the Tw. At time Th[5], the CNT is incremented by one to 2 for update purposes because the difference between the Th and the Tp is not smaller than the Tw. At the next Tp(2) timing at which Th=55, the unupdated Tp is 25 and the difference between the Th (=55) and the Tp (=25) is not smaller than the Tw (=20). Thus, the CNT is incremented by one to 3. As the resulting CNT is not smaller than the Cw (=3), the prediction circuit PRDCT issues an interrupt request for a recovery process to the central processing unit CPU0 in the domain DMN0.

As is obvious from the above timing diagrams, a sign of abnormality is detected in accordance with the count CNT representing a cumulative history that is indicative of the cumulative difference between the latest notification time information Tp retained as the entry data and the current time Th and obtained at predetermined intervals TH. Therefore, in marked contrast to a case where a sign of abnormality is recognized upon a single occurrence of a particular event, sign of abnormality can be detected in such a manner as to enlarge the range of choice between the priority of system safety and the priority of system availability. In other words, when the aforementioned target value Tw and threshold value CW are properly set up, the choice between the priority of system safety and the priority of system availability can be easily made in accordance with the system performance characteristics and system requirements specifications of the microcomputer MCU.

The timings at which the update signals RNW0, RNW1 provide periodic notifications are programmable by adjusting the timeout settings for the timers TMR0, TMR1. Further, the contents of the periodic notifications can be determined as desired by programs that are executed by the central processing units in response to timer interrupts.

Moreover, as the timeout settings for the timers TMR0, TMR1 can be adjusted variously for the central processing units, the timings of the periodic notifications can be set variously for the central processing units.

The intervals TH correspond to the timeout intervals of the timer TMRH. Therefore, the intervals TH are programmable by adjusting the timeout setting for the timer TMRH.

As the history information is the count CNT that indicates the cumulative number of times the periodic notification was delayed from the target value, the cumulative number of times corresponds to the severity of a sign of abnormality. The severity of a sign of abnormality that is to be detected can be easily determined in accordance with the predetermined threshold value Cw.

When an entry data storage area is rendered initially settable by a predetermined central processing unit, the target value and the threshold value can be set in accordance with the real-time processability, processing speed, and other data processing characteristics of a CPU targeted for sign-of-abnormality detection. In other words, a sign of system abnormality can be easily detected in accordance with the functionality and capability of the data processing system.

<<Modified Flows of Abnormality Prediction>>

FIG. 10 is a flowchart showing another example of abnormality prediction. The flowchart shown in FIG. 10 differs from the flowchart shown in FIG. 7 in that the former flowchart includes an additional processing step (step S40). More specifically, the difference Tdiff between the latest notification time information Tp and the current time Th is computed (step S31) to judge whether the computed difference Tdiff has reached the target value Tw (step S32). If the target value Tw is found to be greater than the computed difference Tdiff, the history count CNT is decremented by one (step S40). The other processing steps will not be redundantly described in detail because they are identical with the corresponding steps shown in FIG. 7.

As described above, when the history information is the information indicative of the difference between the number of times the periodic notification was in time for the target value and the number of times the periodic notification was delayed from the target value, the recovery from a sign of abnormality can be evaluated to determine the severity of the sign of abnormality in a situation where the severity of the sign of abnormality varies.

FIG. 11 is a flowchart showing still another example of abnormality prediction. In this example, a cumulative time value ACC is used instead of the entry data count CNT. Referring to FIG. 11, the prediction judgment controller PCNT computes the time difference Tdiff between the latest notification time information Tp and the current time Th (step S31) and judges whether the computed difference has reached the target value Tw (step S32). If the target value Tw is not greater than the difference Tdiff, the prediction judgment controller PCNT adds the difference between the time difference Tdiff and the target value Tw to the cumulative value ACC (step S41). If, on the other hand, the target value Tw is greater than the time difference Tdiff, the prediction judgment controller PCNT subtracts the difference between the target value Tw and the time difference Tdiff from the cumulative value ACC (step S42). The other processing steps will not be redundantly described in detail because they are identical with the corresponding steps shown in FIG. 7.

The magnitude of the cumulative value ACC corresponds to the severity of a sign of abnormality. The severity of the sign of abnormality that is to be detected may be determined in accordance with the predetermined threshold value. When the time difference between the length of extra time provided when the periodic notification was in time for the target value and the length of time by which the periodic notification was delayed from the target value is used as the cumulative time ACC, the recovery from the sign of abnormality can be evaluated to determine the severity of the sign of abnormality in a situation where the severity of the sign of abnormality varies.

An alternative (not shown in the figures) is to skip step S42 of FIG. 11 and use the history information indicative of the cumulative time by which the periodic notification was delayed from the target value.

<<Recovery Process>>

According to the above description, as a request of a recovery process for a CPU, an interrupt request is issued to a central processing unit that performs a recovery process. As an interrupt is used, the details of the recovery process can be determined as desired by the details of an interrupt process.

Figure 12:
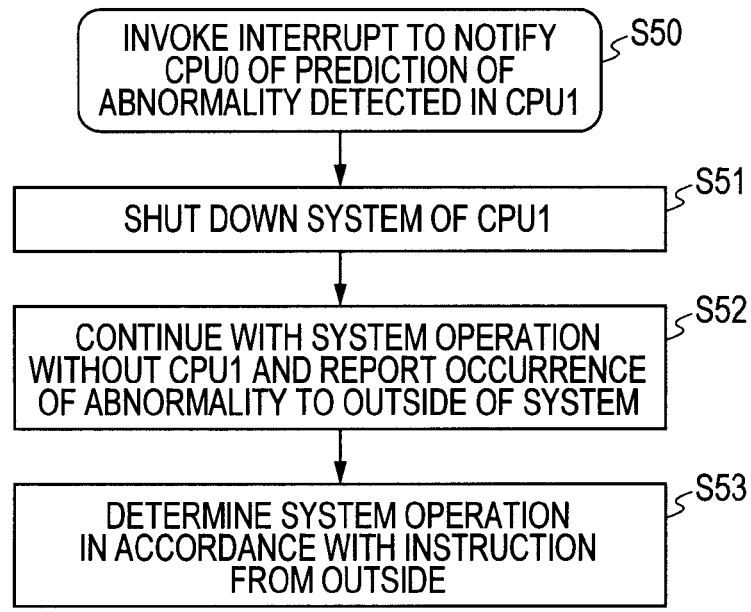
FIG. 12 is a flowchart illustrating a recovery process that is performed by shutdown.

FIG. 12 is a flowchart illustrating a recovery process that is performed by shutdown. Here, it is assumed that a prediction of abnormality in the central processing unit CPU1 is to be detected to let the central processing unit CPU0 perform a recovery process. When the interrupt signal INT0 notifies the central processing unit CPU0 of a prediction of abnormality detected in the central processing unit CPU1 (step S50), the central processing unit CPU0 executes an interrupt processing program related to an associated cause of interrupt to shut down the domain DMN1 for the central processing unit CPU1 (step S51). This will completely prevent an undesired operation of the central processing unit CPU1, which exhibits a sign of abnormality. The central processing unit CPU0 then continues with a system operation without operating the central processing unit CPU1, and notifies the outside of the microcomputer MCU of the occurrence of an abnormality (step S52). Next, the central processing unit CPU0 determines a subsequent operation of the microcomputer MCU in accordance with an instruction from the outside (step S53).

Figure 13:
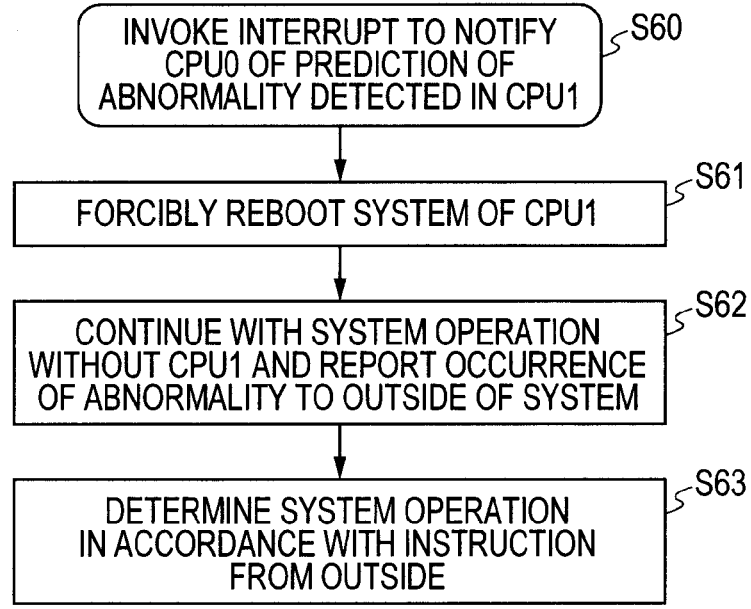
FIG. 13 is a flowchart illustrating a recovery process that is performed by reboot.

FIG. 13 is a flowchart illustrating a recovery process that is performed by reboot. Here, it is assumed that a prediction of abnormality in the central processing unit CPU1 is to be detected to let the central processing unit CPU0 perform a recovery process. When the interrupt signal INT0 notifies the central processing unit CPU0 of a prediction of abnormality detected in the central processing unit CPU1 (step S60), the central processing unit CPU0 executes an interrupt processing program related to an associated cause of interrupt to reboot the domain DMN1 for the central processing unit CPU1 (step S61). This makes it possible to initialize and reuse the central processing unit CPU1, which exhibits a sign of abnormality. After the reboot, the central processing unit CPU0 continues with a system operation without operating the central processing unit CPU1, and notifies the outside of the microcomputer MCU of the occurrence of an abnormality (step S62). Next, the central processing unit CPU0 determines a subsequent operation of the microcomputer MCU in accordance with an instruction from the outside (step S63).

Figure 14:
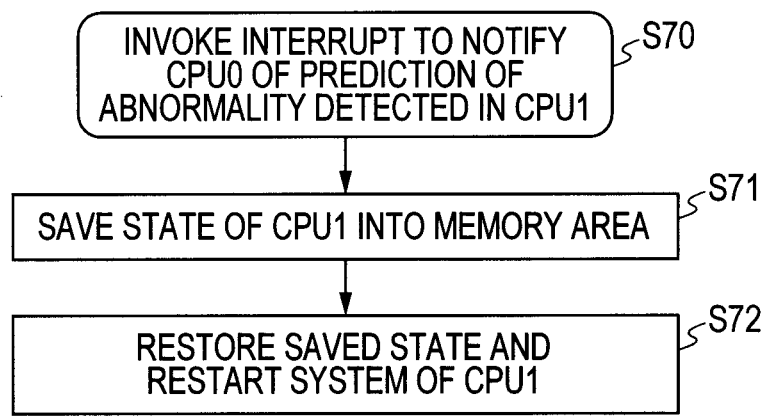
FIG. 14 is a flowchart illustrating a recovery process that is performed by saving relevant information into memory.

FIG. 14 is a flowchart illustrating a recovery process that is performed by saving relevant information into memory. Here, it is assumed that a prediction of abnormality in the central processing unit CPU1 is to be detected to let the central processing unit CPU0 perform a recovery process. When the interrupt signal INT0 notifies the central processing unit CPU0 of a prediction of abnormality detected in the central processing unit CPU1 (step S70), the central processing unit CPU0 executes an interrupt processing program related to an associated cause of interrupt to save the internal state of the central processing unit CPU1 (step S71). This makes it possible to reconfigure the CPU state by using the information saved into memory. The central processing unit CPU0 restores the state of the central processing unit CPU1 by using the saved information, and restarts the domain DMN1 to make it available (step S72).

Figure 15:
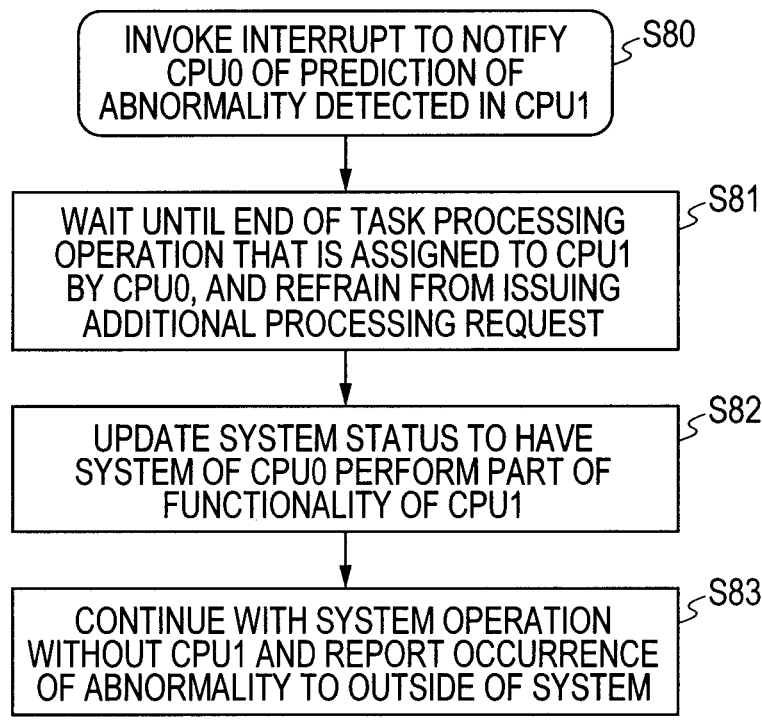
FIG. 15 is a flowchart illustrating a recovery process that is performed by terminating a process-sharing scheme.

FIG. 15 is a flowchart illustrating a recovery process that is performed by terminating a process-sharing scheme. Here, it is assumed that a prediction of abnormality in the central processing unit CPU1 is to be detected to let the central processing unit CPU0 perform a recovery process. When the interrupt signal INT0 notifies the central processing unit CPU0 of a prediction of abnormality detected in the central processing unit CPU1 (step S80), the central processing unit CPU0 waits until the end of a task processing operation that is assigned to the central processing unit CPU1 by the central processing unit CPU0, and refrains from assigning an additional task processing operation to the central processing unit CPU1 (step S81). Next, the central processing unit CPU0 updates the state of the system in such a manner that it performs a process previously assigned to the central processing unit CPU1 (step S82). As the central processing unit CPU0 performs the process previously assigned to the central processing unit CPU1, it is possible to prevent an ongoing processing operation from being interrupted. The central processing unit CPU0 continues with a system operation without operating the central processing unit CPU1, and notifies the outside of the microcomputer MCU of the occurrence of an abnormality (step S83).

<<Another Example of the Microcomputer>>

Figure 16:
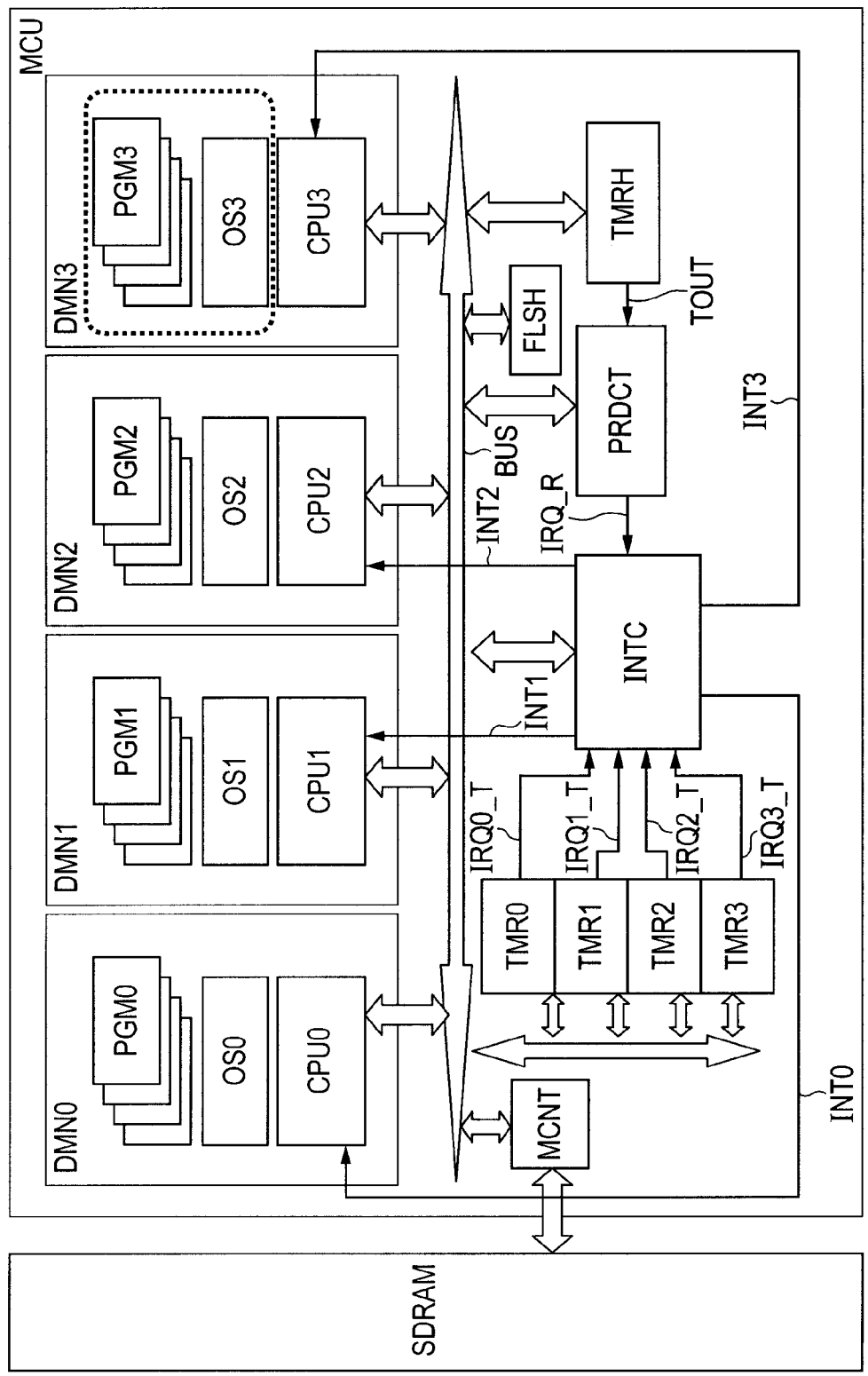
FIG. 16 is a block diagram showing another example of the microcomputer.

FIG. 16 shows another example of the microcomputer. The microcomputer shown in FIG. 16 differs from the microcomputer shown in FIG. 1 in that the former includes four domains DMN0-DMN3 and four timers TMR0-TMR3, and that the timers TMR0-TMR3 output timer interrupt request signals IRQ0_T-IRQ3_T, respectively, and further that the interrupt controller INTC outputs interrupt signals INT0-INT3 to the central processing units CPU0-CPU3, respectively. Circuits unaffected by an increase in the number of circuit units are the same as shown in FIG. 1. The image processing circuit GRF and network communication circuit NET shown in FIG. 1 are also included in the microcomputer shown in FIG. 16 although they are not shown in FIG. 16.

The microcomputer MCU shown in FIG. 16 is integrated into a single semiconductor substrate, as is the case with the microcomputer shown in FIG. 1. As the microcomputer MCU is integrated into a single-chip semiconductor integrated circuit, it is possible to meet a demand for functional enhancement and a demand for cost reduction by integration of plural systems.

While the present invention contemplated by inventors has been described in terms of a preferred embodiment, it should be understood by those skilled in the art that the invention is not limited to the preferred embodiment, but extends to various modifications that nevertheless fall within the scope of the appended claims.

For example, the number of central processing units is not limited to two and four and can be determined as appropriate. The data processing system may be configured without using an operating system. Although an on-chip timer is used to issue the periodic notification and generate intervals at which periodic judgment operations are to be performed, the present invention is not limited to the use of such an on-chip timer.

What is claimed is:

1. A data processing system comprising:
   a plurality of CPUs; and
   a prediction circuit that makes a judgment to predict an abnormality in the CPUs;
   wherein the prediction circuit retains latest notification timing information about periodic notification from the CPUs in association with the CPUs, acquires elapsed time from the latest notification timing at predetermined intervals, successively retains history information corresponding to changes in the elapsed time from a target value in association with the CPUs, and when the retained history information reaches a predetermined threshold value, issues a request for a recovery process for an associated CPU.

2. The data processing system according to claim 1, wherein the periodic notification from the CPUs is a notification that is given to the prediction circuit when the CPUs process a program upon timeout of a first timer.

3. The data processing system according to claim 2, wherein the first timer includes a plurality of timer channels that can perform timeout setup at a timing that varies from one CPU to another.

4. The data processing system according to claim 1, wherein the predetermined intervals correspond to intervals at which a second timer times out.

5. The data processing system according to claim 1, wherein the information about the notification timing is the information about time at which the periodic notification is sent to the prediction circuit.

6. The data processing system according to claim 5, wherein the history information is information indicative of the cumulative number of times the periodic notification was delayed from the target value.

7. The data processing system according to claim 5, wherein the history information is information indicative of cumulative time by which the periodic notification was delayed from the target value.

8. The data processing system according to claim 5, wherein the history information is information indicative of the difference between the number of times the periodic notification was in time for the target value and the number of times the periodic notification was delayed from the target value.

9. The data processing system according to claim 5, wherein the history information is information indicative of the difference between the length of extra time provided when the periodic notification was in time for the target value and the length of time by which the periodic notification was delayed from the target value.

10. The data processing system according to claim 5, wherein the prediction circuit has storage areas for entry data related to the CPUs, the entry data including time information, namely, the information about the notification timing, time information, history information, a target value, and a threshold value.

11. The data processing system according to claim 10, wherein the storage areas for the entry data can be initially set up by a predetermined CPU.

12. The data processing system according to claim 1, wherein a request for a recovery process for an associated CPU is an interrupt request to a CPU for which the recovery process is to be performed.

13. The data processing system according to claim 12, further comprising:
an interrupt controller that outputs an interrupt signal to a CPU in response to the interrupt request.

14. The data processing system according to claim 1, wherein the recovery process is a shutdown process for an associated CPU.

15. The data processing system according to claim 1, wherein the recovery process is a reboot process for an associated CPU.

16. The data processing system according to claim 1, wherein the recovery process is a process that is performed by saving the internal state of an associated CPU into memory.

17. The data processing system according to claim 1, wherein the recovery process is a process that is performed by terminating a process assigned to an associated CPU and performing the process locally.

18. The data processing system according to claim 1, being formed as a microcomputer on a semiconductor substrate.

* * * * *